July 12, 1955 C. B. LEACH Re. 24,035

VALVE ROCKER MOUNTING

Original Filed Sept. 2, 1950 2 Sheets-Sheet 1

Inventor
Clayton B. Leach
By Willis, Helwig & Baillio
Attorneys

VALVE ROCKER MOUNTING

Original Filed Sept. 2, 1950 2 Sheets-Sheet 2

Inventor
Clayton B. Leach
By
Willitts, Helwig & Baillio
Attorneys

United States Patent Office

Re. 24,035
Reissued July 12, 1955

24,035

VALVE ROCKER MOUNTING

Clayton B. Leach, Pontiac, Mich., assignor to General Motors Corporation, Detroit, Mich., a corporation of Delaware Original No. 2,669,981, dated February 23, 1954, Serial No. 183,026, September 2, 1950. Application for reissue April 29, 1954, Serial No. 426,623

17 Claims. (Cl. 123—90)

Matter enclosed in heavy brackets [ ] appears in the original patent but forms no part of this reissue specification; matter printed in italics indicates the additions made by reissue.

This invention relates to valve operating mechanisms for internal combustion engines and the like, and particularly to the mounting and lubrication of rockers of overhead type valve operating mechanisms.

One of the objects of the invention is to provide improved means for supporting the valve rocker which greatly facilitates valve adjustment and lubrication of the rocker, and is highly adapted for use with stamped sheet metal rockers of low cost manufacture.

Another object of the invention is to provide valve rocker supporting means arranged independently for each rocker and in which the push rod, valve stem and a stud anchored to the cylinder head all cooperate with each other in a new and novel manner.

These and other objects are attained in accordance with my invention by the structures hereinafter described and shown in the drawings, in each modification of which a rocker of generally channel shape section is provided which bears downwardly at opposite ends upon the push rod and valve stem and is fulcrumed intermediately of its ends by means of a stud fixedly anchored at one end to the cylinder head and extending through the rocker to provide a bearing seat about which the rocker may oscillate during reciprocation of the push rod and valve.

Figure 1:
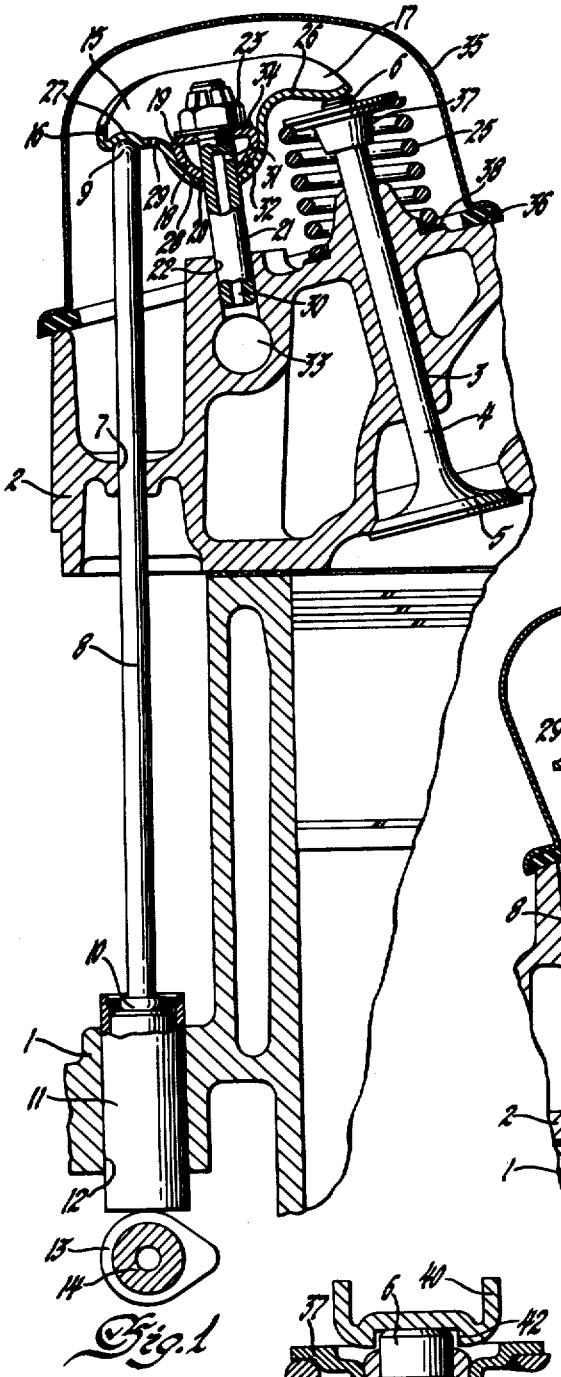
Figure 1 is a view partly in section and partly in elevation showing a portion of an internal combustion engine incorporating a valve rocker with supporting and lubricating means in accordance with one form of my invention, and wherein the rocker is maintained in its proper plane of oscillation by the push rod which in turn is guided by the engine frame structure.

In the drawings there is shown an engine frame structure of conventional overhead valve type including a cylinder block 1 and a cylinder head 2. Slidably guided for axial reciprocation in the bore 3 of the cylinder head is the stem 4 of a poppet valve 5 the upper end 6 of which projects above the cylinder head, and similarly guided in the bore 7 of the head is a push rod 8 which is disposed laterally of the valve stem 4 and has its upper end 9 also projecting above the cylinder head. The lower end 10 from the push rod abuts the upper end of a valve tappet 11 which is slidably guided for axial reciprocation in the tappet bore 12 provided in the cylinder block 1. A cam 13 is shown on which rests the lower end of the tappet 11 and whose shaft 14 is rotatively driven in any desired manner (not shown) to effect reciprocation of the tappet and push rod.

Operatively connecting the push rod and valve stem is a valve rocker 15 having arms 16 and 17 overlying and resting upon the upper ends 9 and 6 of the push rod and valve stem, respectively. Adjacent the outer end of its arm 16 the bottom surface of the rocker is spherically dished to socketably receive the push rod upper end 9 in bearing relation, and intermediate the push rod and valve the rocker 15 is provided on the upper surface of the rocker with a spherically dished bearing surface 18 which socketably receives a washer 19 having a correspondingly shaped bottom surface forming a seat for the rocker. Centrally of the bearing surface 18, the rocker is provided with an aperture 20 through which extends an elongated member 21 in the form of a stud having its lower end fixedly anchored as by a press fit in the hole 22 in the cylinder head and provided at its upper end with a threaded nut 23 which serves to retain the washer 19.

During the lift stroke of the cam 13 the upward movement of the push rod will cause the rocker 15 to rotate about the washer 19 in a clockwise direction as viewed in Figure 1 to transmit the push rod thrust to the valve stem 4 and effect opening of the valve against the biasing force of the valve spring 25. Then on the return stroke, the force of the spring 25 will drive the rocker counterclockwise about the washer 19 and effect the return of the push rod. Since there is at all times an upward thrust exerted upon each end of the rocker the bearing surface 18 is maintained in contact at all times with the washer 19 and the rocker is restrained from rotation about the axis of the stud 21. This manner of fulcruming the rocker enables the rocker to be formed as a sheet metal stamping having, as shown, a generally channel shaped section. The web 26 of the channel has an upwardly projecting embossment 27 which socketably receives the upper end 9 of the push rod and a downwardly projecting embossment 28 forming the spherical bearing surface 18 and terminating in the aperture 20. With the push rod 8 slidably guided in the bore 7 of the cylinder head as shown in Figure 1, this socketed engagement of the push rod upper end 9 serves to prevent rotation of the rocker about the axis of the stud 21 in operation, and accordingly the web 26 need have only sliding contact with the valve stem upper end 6. The small lateral component of movement of the push rod upper end 9 in following the rotational movement of the rocker arm 16 has been found not to cause any objectionable binding in the bore 7.

As means for lubricating the bearing surface 18, I provide the stud 21 with a longitudinal passage 30 which extends from the lower end of the stud and connects with a radial passage 31 leading outward to the interior of the washer 19 from which the oil passes through one or more drilled passages 32 provided in the wall of the washer 19. The oil as it passes from between the bearing surface 18 and the washer 19 will escape through the aperture 20 around the stud 21 and flow downward onto the cylinder head from which it lubricates the push rod guide bore 7. Any oil in excess of that which can drain through the aperture 20 and which tends to collect on the upper surface of the rocker channel web will drain down through the hole 29 provided for that purpose. Oil may be supplied to the passage 30 from the hole 22 under pressure from a gallery 33 running endwise of the engine and communicating with the lower end of the hole 22.

Adjustment of the valve clearance is made by screwing the nut 23 further on or off the stud 21. To facilitate such adjustment the nut 23 is preferably of the self-locking type requiring but a single wrench for adjustment on the stud 21. A Belleville spring washer 34 is preferably provided between the nut 23 and washer 19 to eliminate lash in the valve train throughout the operating cycle.

A rocker cover 35 of conventional inverted channel shape is shown enclosing the top of the cylinder head 2 and sealed thereto by the usual gasket 36. Also in conventional manner, the valve spring 25 transmits its thrust to the valve stem through a retaining washer 37. The lower end of the valve spring abuts an annular Belleville spring 38 which has a dished configuration as shown in Figure 1 when the valve is closed but during valve opening collapses into mating engagement with the cylinder head, and in so doing serves both to damp surge of the valve spring 25 and to temporarily trap surface oil between the Belleville spring and the cylinder head during a portion of each valve opening stroke, whereby the Belleville spring and hence the lower end of the valve spring are alternately restrained and allowed to rotate relative to the cylinder and intermittent rotation of the valve is obtained.

Figure 2:
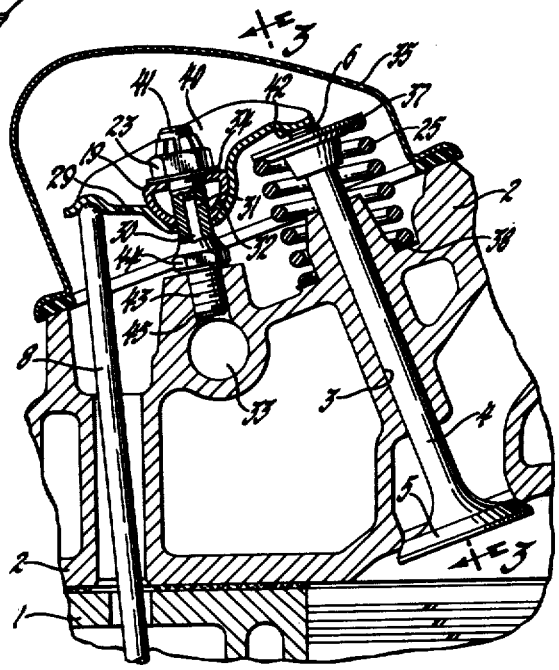
Figure 2 is a view similar to Figure 1 but showing a modified form of rocker supporting stud and also a different arrangement for restraining rotation of the rocker about the stud axis.
Figure 3:
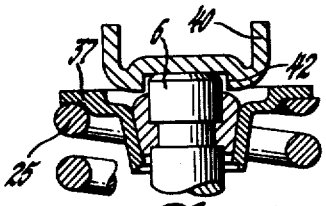
Figure 3 is a sectional view taken substantially on line 3—3 of Figure 2.

In the modification of my invention shown in Figure 2 the push rod is not slidably guided in either the cylinder head 2 or the cylinder block 1 and hence does not serve to restrain the rocker 40 from rotation about its stud 41. In lieu thereof the rocker 40 has its web embossed upwardly opposite the valve to provide a recess 42 in which is received the upper end 6 of the valve stem. This recess 42 extends longitudinally of the rocker 40 to accommodate relative sliding movement between the stem and the web of the rocker.

Also in Figure 2 a somewhat different form of stud is used for supporting the washer 19, this stud 41 having an externally threaded lower end portion 43 which screws into a threaded hole 45 in the cylinder head, and an integral enlargement 44 at the upper end of this threaded portion which serves as a jam nut for the stud in securing it to the cylinder head.

Figure 4:
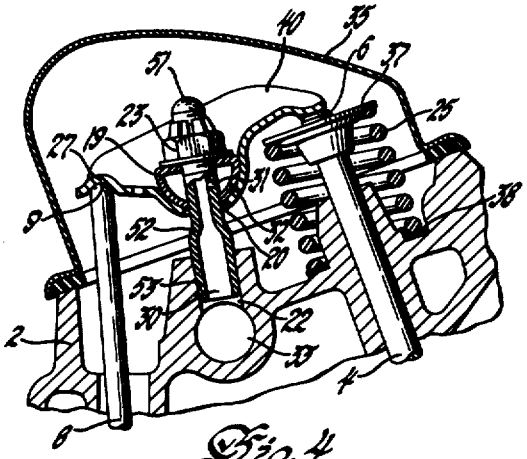
Figures 4 and 5 are views similar to Figure 2 but showing successively modified forms of the rocker supporting stud.

In Figure 4 I have shown a similar arrangement to that of Figure 2, i. e. with the push rod unguided in the engine structure and the valve stem keyed to the rocker for maintaining it in proper registry, but with a modified form of the rocker supporting stud shown in Figure 1. This particular stud 51 is formed from tubing stock and has an upper shank portion similar to the stud 21 of Figure 1 and an expanded lower end portion 52 having a pressed fit in an enlarged hole 53 of the cylinder head.

Figure 5:
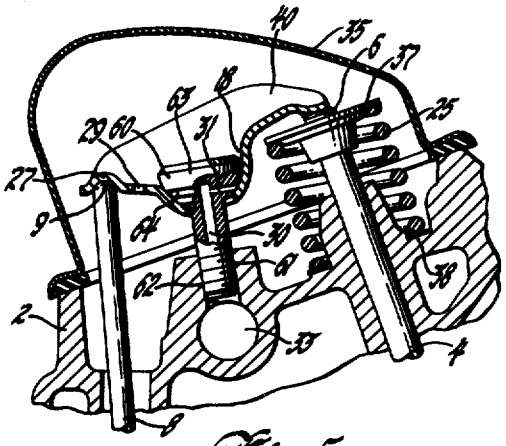

In Figure 5 the structure is the same as Figure 2 with the exception of employing a modified form of stud 60. The stud 60 has an externally threaded shank 61, its threads being of the self-locking type and engaging a threaded hole 62 in the cylinder head. The head 63 of this stud directly engages the bearing surface 18 of the rocker, eliminating the use of the washer 19 of Figure 1. The surface of the head 63 facing the bearing surface 18 is spherical in contour and is relieved by an annular groove 64 in communication with the radial oil passage 31. Suitable wrench engaging means such as a conventional screw driver slot or socket (not shown), are provided in the upper end face of the head 60.

Figure 6:
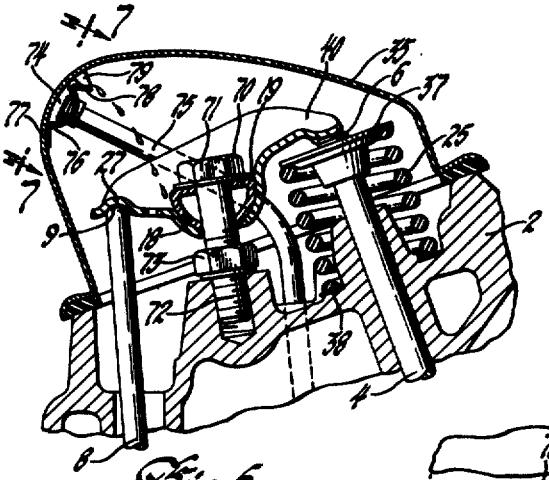
Figure 6 is a view similar to Figure 2 but showing a still further modified form of the rocker supporting stud and an alternative means for lubricating the rocker pivot bearing.
Figure 7:
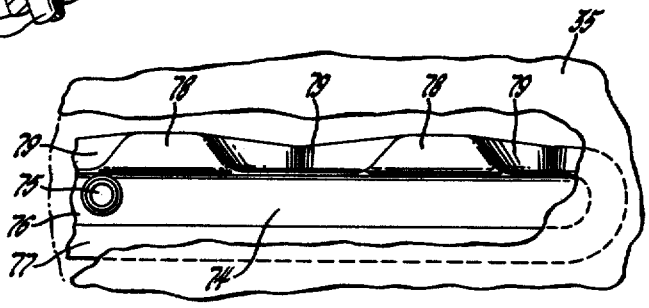
Figure 7 is an enlarged detail elevational view taken from line 7—7 of Figure 6.

In Figure 6 an alternative means for supporting the washer 19 is shown in the form of a cap screw 70, the head 71 of which serves as an abutment for the washer and the shank 72 threads into the cylinder head. A jam nut 73 is provided for locking the stud against displacement in operation. As shown with this rocker mounting arrangement is an alternative form of lubrication for the rocker bearing surface 18 in the form of an oil gallery 74 provided on the inner wall surface of the rocker cover 35 and supplied with lubricant through a tube 75 extending through the cylinder head 2. This gallery may be suitably formed by an upwardly presenting channel shaped stamping 76 having its side walls outwardly flanged as at 77 and 78 and welded to the inner surface of the rocker cover 35. This gallery extends longitudinally of the engine and is in a position elevated with respect to the rockers 40 associated with the various cylinders of the engine. Opposite each rocker the flange 78 of the stamping 76 is turned outwardly and spaced from the inner surface of the rocker cover to provide a trough or lip 79 over which oil may spill from the gallery and drop on to the web of the rocker and thence flow to the bearing surface 18.

It will of course be understood that the various rocker supporting studs, means for restraining the rocker against rotation axially of the stud, and the rocker lubricating systems described above and shown in the drawings may be rearranged in different combinations from those suggested, all within the scope of the appended claims.

I claim:

1. In combination, a cylinder head, a poppet valve and a push rod each axially reciprocable in and terminating externally of the cylinder head, a rocker having one side in abutment with one end each of the valve and push rod and an aperture intermediate the valve and push rod, a bearing surface on the opposite side of the rocker adjacent said aperture, an elongated member fixed at one end to the cylinder head and extending through said aperture, a seat on the member abutting said bearing surface on the rocker, said bearing surface and seat having cooperating configurations defining the rocking axis of the rocker intermediate the valve and push rod and said member having clearance in said aperture accommodating *rocking* [oscillation] of the rocker [about an axis intermediate the valve and push rod] during simultaneous axial movement of the valve and push rod in opposite directions.

2. In an internal combustion engine, a cylinder head, a poppet valve having a stem slidably supported in the cylinder head for axial reciprocation, an axially reciprocable push rod arranged generally in the same plane with the valve stem, a rocker for transmitting axial thrust between the valve stem and the push rod, said rocker having surfaces on one side engaged respectively by the valve stem and push rod and a bearing surface on its opposite side intermediate the valve stem and push rod, said bearing surface having a curvature in a plane longitudinally of the rocker, and means *pivotally* journaling said bearing surface having a shank extending through the rocker and anchored to the cylinder head.

3. In an internal combustion engine, a cylinder head, a poppet valve having a stem slidably supported by the cylinder head for axial reciprocation, a push rod disposed laterally of the valve stem and arranged to axially reciprocate in opposite phase to said valve, a rocker having surfaces on one side in respective driving engagement with the push rod and valve, a washer *journaling pivotal movement of the rocker* [about which the rocker may pivot] in response to reciprocation of said push rod and valve, said washer and rocker having coating bearing surfaces on the opposite side of the rocker, and a stud fixedly securing said washer to the cylinder head.

4. In an internal combustion engine having a cylinder head, poppet valve mounted for axial reciprocation therein, an axially reciprocable push rod arranged laterally of the valve, and a rocker for transmitting reciprocable movements between the push rod and valve, said rocker having oppositely extending arms resting on the upper ends of the valve and push rod respectively and an upwardly presenting socket intermediate said arms, a stud fixedly anchored at its lower end to the cylinder head and extending into said socket, and a washer on said stud rotatively journaling the rocker in said socket for oscillatory movement of the arms in response to reciprocation of the valve and push rod.

5. In an internal combustion engine, a cylinder head having a pressure fed oil gallery, a stud anchored at one end to the cylinder head, a washer on the opposite end of said stud provided with a spherical seat surface opposite the cylinder head, said stud having an internal oil passage connecting said seat surface and oil gallery, and a valve rocker having an opening intermediate its ends loosely embracing said stud and an annular spherical bearing surface surrounding said opening and socketably receiving said seat surface.

6. In an internal combustion engine, a cylinder head, a reciprocable poppet valve having a stem guided in the cylinder head, a push rod reciprocable relative to the cylinder head and valve, a rocker operatively connecting the valve stem and push rod, an elongated member having threaded engagement at one of its ends with the cylinder head and extending through the rocker intermediate the valve stem and push rod, and means on the extended end of said member constituting a seat *about which the rocker* oscillatably *pivots* [supporting the rocker] during reciprocation of the valve and push rod.

7. In combination, a cylinder head, a poppet valve and a push rod reciprocable relative to and terminating exteriorly of the cylinder head, a rocker for transmitting thrust between the push rod and valve, said rocker being of generally upwardly presenting channel section with the channel web having upwardly projecting embossments socketably receiving the upper ends of the push rod and valve respectively and a downwardly projecting embossment located intermediate the push rod and valve, said downwardly projecting embossment having a spherical bearing surface on its upper side and terminating in an aperture, an annular washer having a spherical bottom surface fitting said bearing surface, a tension member extending through the washer and aperture and having a press fit at its lower end in the cylinder head, and a washer retaining nut threadedly engaging the upper end of said tension member, said tension member having connecting longitudinal and radial passages therein for conducting lubricant from the cylinder head to said bearing surface.

8. In combination, a cylinder head, a poppet valve and a push rod reciprocable relative to the cylinder head, a rocker having surfaces on one side in one-way thrust transmitting engagement with the valve and push rod respectively, said rocker having an aperture intermediate the valve and push rod and a bearing surface adjacent said aperture on the side of the rocker opposite said first mentioned surfaces, a stud having a press fit at one end in the cylinder head and extending through the aperture in the rocker, a washer on the stud *pivotally* journalling said rocker bearing surface, and a washer retainer threadedly engaging the stud.

9. In combination, a cylinder head, a poppet valve and a push rod reciprocable relative to the cylinder head, a rocker having surfaces on one side in one-way thrust transmitting engagement with the valve and push rod respectively, said rocker having an aperture intermediate the valve and push rod and a bearing surface adjacent said aperture on the side of the rocker opposite said first mentioned surfaces, a stud having externally threaded portions adjacent its respective ends, one of said threaded portions being screwed into the cylinder head, a shoulder integral with the stud and abutting the cylinder head, a washer embracing the stud and *pivotally* journaling said rocker bearing surface, and a nut on the other of said stud threaded portions thrustably supporting said washer.

10. The combination with a cylinder head, a reciprocable poppet valve having a stem guided in the cylinder head, a push rod reciprocable relative to the cylinder head and valve, and a rocker operatively connecting the push rod and valve stem, of fulcrum means for the rocker, said means comprising a stud fixedly anchored at one end to the cylinder head and extending through the rocker intermediate the push rod and valve stem, a spherical bearing surface on the rocker, and a spherical seat on the stud journaling said rocker bearing surface.

11. In combination, a cylinder head, a push rod and a valve axially reciprocable therein and terminating above said cylinder head, a rocker of upwardly presenting channel section having a web resting on the upper ends of the push rod and valve, a downwardly projecting embossment formed in said web intermediate the push rod and valve, said embossment having a spherical bearing surface on its upper side and terminating in an aperture, an annular washer having a spherical bottom surface fitting said bearing surface, a cap screw extending through said washer and aperture with the head of the screw abutting the upper surface of the washer and the shank of the screw threadedly inter-engaging the cylinder head, a jam nut on the screw shank bottoming against the cylinder head, a rocker cover of inverted channel shape having side walls engaging the cylinder head laterally of the push rod and valve, a generally upright channel member having side walls terminating in abutment with the inner surface of said rocker cover and forming therewith an oil gallery above and transversely of the rocker, one of said upright channel member side walls having a portion opposite the rocker terminating in spaced relation with said rocker cover inner surface to permit oil to flow out of said gallery for gravitation to said rocker bearing surface, and a tube extending into the cylinder head from said gallery through which oil may be delivered under pressure to the gallery.

12. In an internal combustion engine, an engine structure including a cylinder head, said structure or cylinder block having a tappet bore, said cylinder head having a push rod bore aligned with said tappet bore and a valve stem bore disposed laterally of said push rod bore, a cam operated tappet slidably guided for axial reciprocation by said tappet bore, a push rod slidably guided for axial reciprocation by said push rod bore, one end of said push rod thrustably abutting the tappet and the other end extending above the cylinder head, a poppet valve having a stem slidably guided for axial reciprocation by said valve stem bore and having an end terminating above the cylinder head, an elastic member biasing said valve stem upwardly relative to the cylinder head, a rocker having oppositely disposed arms overlying and resting on the upper ends of the push rod and valve stem respectively, an upwardly presenting spherical bearing surface on the rocker intermediate the push rod and valve, a stud extending loosely through the rocker at said bearing surface and fixedly anchored at one end to the cylinder head, and a washer on said stud providing a downwardly presenting spherical seat for said bearing surface.

*13. In an internal combustion engine or the like having a poppet valve with a return spring connected thereto and a reciprocably driven member for operating said valve in the direction opposed by its spring with each stroke of the member in a direction substantially opposite that of the valve, a rocker for transmitting valve operating movements from said member to the valve, said rocker having spaced apart surfaces on one side drivingly engageable with oppositely facing surfaces of the member and valve and a bearing surface intermediate and on the opposite side of the rocker from said spaced apart surfaces, said bearing surface having an aperture extending through the rocker from said one side, and means extending through said aperture provided with a seat pivotally journalling said bearing surface about the rocking axis of the rocker.*

*14. A rocker for transmitting reciprocatory movements between a poppet valve and its push rod, said rocker having generally correspondingly presenting surfaces on one side adjacent its opposite ends adapted to engage the driving and driven ends of the valve and rod, respectively, an oppositely presenting pivotal bearing surface for the rocker on its opposite side intermediate said first named surfaces adapted to journal on a cooperating seat, and an*

*aperture extending between said bearing surface and said one side for passage of seat supporting means.*

*15. A rocker in the form of a generally channel shaped member for transmitting motion between oppositely reciprocating elements of an engine valve gear, having embossments in its channel web adjacent each end, a third embossment in said web intermediate said end adjacent embossments, and an aperture in said web disposed substantially centrally of said third embossment, one of said end adjacent embossments and said third embossment being in correspondingly presenting relation to the channel sides, the other of said end adjacent embossments being in oppositely presenting relation, said third embossment providing surfaces having a curvature in a plane longitudinally of the rocker.*

*16. A sheet metal rocker adapted to transmit motion between laterally separated oppositely reciprocating elements, including a web portion with at least one of its longitudinally extending edges reinforced by an integral side wall, said web having longitudinally spaced portions thereof embossed to socketably interengage associated end portions of said reciprocating elements and having an intermediate portion embossed and apertured to form a spherical annular bearing surface about a support extending through the rocker.*

*17. A sheet metal rocker adapted to transmit motion between oppositely reciprocating elements on laterally opposite sides of a fulcrum, including a web portion extending the full length of the rocker with at least one reinforcing integral wall portion extending in a plane generally longitudinally and perpendicularly thereof, said web portion having longitudinally spaced portions providing two oppositely presenting concave bearing surfaces intermediate its ends and adjacent one end for socketably receiving said fulcrum and one of said reciprocating elements, respectively, said web portion having a portion adjacent its other end providing a convex bearing surface for the other reciprocating element, said convex bearing surface being in oppositely presenting relation to said intermediate bearing surface.*

References Cited in the file of this patent or the original patent

UNITED STATES PATENTS

| | | |
|---|---|---|
| 1,265,735 | Brush | May 14, 1918 |
| 1,636,903 | Dodge | July 26, 1927 |
| 1,659,528 | Hosterman | Feb. 14, 1928 |
| 1,741,678 | Brewer | Dec. 31, 1929 |
| 1,797,105 | Shoblom | Mar. 17, 1931 |
| 1,877,051 | Read | Sept. 13, 1932 |
| 2,572,968 | Bachle | Oct. 30, 1951 |

UNITED STATES PATENT OFFICE

CERTIFICATE OF CORRECTION

Reissue No. 24,035

July 12, 1955

Clayton B. Leach

It is hereby certified that error appears in the printed specification of the above numbered patent requiring correction and that the said Letters Patent should read as corrected below.

Column 3, line 72, for "As" read --Also--; column 4, line 61, for "coating" read --coacting--; line 65, before "poppet" insert --a--.

Signed and sealed this 6th day of September 1955.

(SEAL)

Attest:

KARL H. AXLINE
Attesting Officer

ROBERT C. WATSON
Commissioner of Patents